United States Patent
Arcella et al.

(10) Patent No.: US 9,315,620 B2
(45) Date of Patent: Apr. 19, 2016

(54) (PER)FLUOROPOLYMER COMPOSITION

(75) Inventors: Vincenzo Arcella, Nerviano (IT); Claudio Adolfo Pietro Tonelli, Lecco (IT); Solange Barbieri, Baranzate (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 0 days.

(21) Appl. No.: 14/236,282

(22) PCT Filed: Jul. 17, 2012

(86) PCT No.: PCT/EP2012/063951
§ 371 (c)(1),
(2), (4) Date: Feb. 7, 2014

(87) PCT Pub. No.: WO2013/017401
PCT Pub. Date: Feb. 7, 2013

(65) Prior Publication Data
US 2014/0235816 A1    Aug. 21, 2014

(30) Foreign Application Priority Data
Aug. 2, 2011  (EP) .................... 11176341

(51) Int. Cl.
C08G 65/00 (2006.01)
C08L 71/00 (2006.01)
C08L 27/12 (2006.01)
C08G 65/333 (2006.01)

(52) U.S. Cl.
CPC .............. *C08G 65/00* (2013.01); *C08G 65/007* (2013.01); *C08G 65/33303* (2013.01)

(58) Field of Classification Search
None
See application file for complete search history.

(56) References Cited

U.S. PATENT DOCUMENTS

| 3,876,617 A | 4/1975 | Caporiccio et al. |
| 4,080,319 A | 3/1978 | Caporiccio et al. |
| 4,760,126 A * | 7/1988 | Numata et al. ................ 528/353 |
| 5,536,425 A | 7/1996 | Kondo et al. |
| 6,114,452 A | 9/2000 | Schmiegel |
| 6,350,306 B1 | 2/2002 | Tonelli et al. |
| 6,500,904 B1 * | 12/2002 | Hayes ........................... 525/419 |
| 2005/0197460 A1 | 9/2005 | Patel et al. |

FOREIGN PATENT DOCUMENTS

| EP | 59522 B1 | 1/1987 |
| EP | 969023 A2 | 1/2000 |
| EP | 1114842 B1 | 7/2004 |
| EP | 1690882 B1 | 4/2008 |
| GB | 1351321 A | 4/1974 |
| JP | 01265049 A | 10/1989 |
| JP | 09255976 A | 9/1997 |
| JP | 2001110039 A | 4/2001 |
| JP | 2001110040 A | 4/2001 |
| JP | 2001110041 A | 4/2001 |
| JP | 2001110042 A | 4/2001 |
| WO | 9919080 A1 | 4/1999 |
| WO | 03059964 A2 | 7/2003 |
| WO | 2006016041 A1 | 2/2006 |
| WO | 2006087475 A1 | 8/2006 |
| WO | 2010049365 A2 | 5/2010 |

OTHER PUBLICATIONS

Cordier P. et al., "Self-healing and thermoreversible rubber from supramolecular assembly", Nature Letters, Feb. 21, 2008, vol. 451, p. 977-980—Nature Publishing Group.
Tonelli C. et al., "Linear perfluoropolyether difunctional oligomers: chemistry, properties and applications", Journal of Fluorine Chemistry, Jun. 4, 1999, vol. 95, issues 1-2, p. 51-70—Elsevier Science SA.

* cited by examiner

*Primary Examiner* — Ana Woodward

(57) ABSTRACT

The present invention relates to (per)fluoropolymer compositions, in particular to (per)fluoropolyether compositions comprising:—a (per)fluoropolymer having more than two carboxy groups and—a polyamine. The invention further relates to processes for preparing said compositions and to molded articles obtained from said compositions.

16 Claims, No Drawings

(PER)FLUOROPOLYMER COMPOSITION

This application is a U.S. national stage entry under 35 U.S.C. §371 of International Application No. PCT/EP2012/063951 filed Jul. 17, 2012, which claims priority to European application No. 11176341.3, filed on Aug. 2, 2011. The entire contents of these applications are explicitly incorporated herein by this reference.

TECHNICAL FIELD

The present invention relates to (per)fluoropolymer compositions, in particular to (per)fluoropolyether compositions wherein the (per)fluoropolyether comprises moieties able to form hydrogen bonds.

BACKGROUND ART

Supramolecular assemblies of polymer compounds than contain moieties able to form hydrogen bonds are known in the art.

For instance, CORDIER, Philippe, et al. Self-healing and thermoreversible rubber from supramolecular assembly. Nature Letters. 21 Feb. 2001, vol. 451, p. 977-980. disclose supramolecular assemblies containing oligomers obtained by reaction of mixtures of fatty acids, namely mono-, di- and triacids, from natural resources with diethylene triamine and urea. These oligomers are able to form intermolecular hydrogen bonds and, when admixed with a certain amount of dodecane, behave like rubbers and exhibit self-healing properties, i.e. they are able to self-repair without the need to heat or press strongly.

Similarly, WO 03/059964 A (ATOFINA) 24 Jun. 2003 discloses supramolecular polymer assemblies joined together through hydrogen bonds, wherein the polymers derive from fatty acids and contain ethylene-diamino or propylene-diamino and urea moieties for use as rheological modifiers in paints or lining or as additives for adjusting the fluidity of epoxy-paints.

WO 2006/087475 A (ARKEMA FRANCE) 24 Aug. 2006 discloses materials comprising fatty acid derivatives having at least three associative functional groups able to form intermolecular bonds, in particular hydrogen bonds. Said materials become fluid above a certain temperature and, upon cooling, they exhibit again rubber elasticity and are taught to be self-repairing.

WO 2006/016041 A (ARKEMA; CENTRE NATIONAL DE LA RESERCHE SCIENTIFIQUE (CNRS)) 16 Feb. 2006 discloses a polymeric material consisting of macromolecular chains joined together through hydrogen bonds, wherein the macromolecular chains are made of a polymer skeleton containing a modifying agent, namely imidazolidone, joined to the polymer chain through —C(O)O—, —OC(O)—, —C(O)NH—, —NH(CO)—, C(O), —O—, —S— and —NH— bridges. Polymer skeletons are preferably selected from polyolefines, polydienes, polyvinyles, polyacrylates, polymethacrylates, polyesters, polyamides, polyethers, polycarbonates, polysiloxanes and polyurethanes. The presence of a modifying agent allows to increase the elastic module in a broad temperature range and allows to increase resistance to solvents.

WO 99/019080 A (NORTH CAROLINA STATE UNIVERSITY) 22 Apr. 1999 relates to a composition comprising carbon dioxide and a fluoropolyether, preferably a perfluoropolyether (PFPE), for protecting civil infrastructures. The fluoropolyether may have an anchoring group covalently joined thereto, at one or both ends of the polymer chain; among anchoring groups, amides, in particular a monoamide of a PFPE with isopropylamine, a diamide of a PFPE having one carboxy function with ethylendiamine and a diamide with 1,6-hexane diamine are mentioned.

U.S. Pat. No. 3,876,617 A (MONTEDISON SPA) 8 Apr. 1974 discloses elastomeric polymers comprising polyamido groups in the macromolecular chain; such polymers can be obtained by reaction of a PFPE containing one carboxy group at each polymer end having formula: $HOOC-CF_2O(C_2F_4O)_1-(CF_2O)_n-CF_2COOH$ with a diamine. These polymers can be cross-linked to form elastomers with excellent mechanical properties, high elasticity and flexibility at low temperature and good chemical and thermal stability.

GB 1351321 A (MONTEDISON SPA) 24 Apr. 1974 discloses diarylamides of mono- or di-carboxy PFPEs; these amides can be used as lubricants or heat-exchange fluids, as they can withstand high temperatures and high shearing stresses for high periods.

U.S. Pat. No. 5,536,425 (SONY CORPORATION) discloses PFPE derivatives useful as lubricants for magnetic recording media; the PFPE lubricants are obtained by reaction PFPEs having a carboxyl group at one or both ends with monoamines or diamines.

Neither WO99/019080 A, nor U.S. Pat. No. 3,876,617 A, nor GB 1351321, nor U.S. Pat. No. 5,536,425 disclose or suggest the reaction of PFPEs containing more than two carboxy groups with a polyamine.

EP 0969023 A (E.I. DU PONT DE NEMOURS AND CO) relates to functionalized thermoplastic fluoropolymers which are said to crosslinkable by a thermal process. In particular, example 1 discloses a composition comprising an ETFE copolymer grafted with maleic anhydride and a polyamine, namely p-phenylenediamine.

U.S. Pat. No. 6,114,452 (E.I. DU PONT DE NEMOURS AND COMPANY) relates to perfluoroelastomer compositions which are said to possess high thermal stability. In particular, claim 21 discloses a composition comprising a perfluoroelastomer having a plurality of carbonyl-containing functional groups in admixture with a definite amount of a curing agent other than an organotin curing agent. Claims 29-33 specify that the curing agent can be a polyamine.

Neither EP 0969023 nor U.S. Pat. No. 6,114,452 disclose or suggest compositions based on PFPE containing more than two carboxy groups that can be crosslinked with a polyamine.

WO 2010/049365 (SOLVAY SOLEXIS SPA) relates to fluorinated thermoplastic polymer additives for reducing the coefficient of friction of non-fluorinated polymers. The fluorinated polymers comprise fluorinated segments and hydrogenated segments, and are obtainable by a reaction of polycondensation, polyaddition in stages or polyaddition of:
  a (per)fluoropolyether having two functional end groups able to give reactions of condensation or addition with hydrogenated coreactants and
  a hydrogenated coreactant.

The resulting polymer comprises at least a hydrogenated phase having a melting point of at least 25° C.

U.S. Pat. No. 6,350,306 (AUSIMONT SPA) discloses cross-linkable formulations containing a fluoropolyether which comprises a fluorine-containing part $R_F$ and optionally a hydrogenated part $R_H$, wherein the bonds joining the fluorine-containing part $R_F$ and the hydrogenated part $R_H$ is a —C—O—C— bond and wherein the hydrogenated part $R_H$ does not contain groups capable of linking by means of hydrogen bonds to basis acceptors.

SUMMARY OF INVENTION

It has now been found that polymer compositions comprising a (per)fluoropolymer having more than two carboxy groups and a polyamine are able to form supramolecular assemblies joined together through hydrogen bonds.

Accordingly, the present invention relates to a polymer composition comprising, preferably consisting of:
- a (per)fluoropolymer, preferably a (per)fluoropolyether, having more than two carboxy groups and
- a polyamine.

For the purposes of the present invention, the term "(per) fluoropolyether" [(P)FPE] identifies a polymer comprising a fully or partially fluorinated polyoxylakylene chain [herein after also referred to as ($R_f$) chain] which comprises, preferably consists of, recurring units having at least one catenary ether bond and at least one fluorocarbon moiety; typically, the ($R_f$) chain comprises one or more randomly distributed repeating units selected from the following groups:
(i) —CFXO—, wherein X is F or $CF_3$;
(ii) —$CF_2$CFXO—, wherein X is F or $CF_3$;
(iii) —$CF_2CF_2CF_2O$—;
(iv) —$CF_2CF_2CF_2CF_2O$—.

Preferably, the repeating units are selected from —$CF_2O$— and —$CF_2CF_2O$— units; more preferably the repeating units are —$CF_2O$— and —$CF_2CF_2O$— units and their molar ratio in the polymer chain ranges preferably from 0.1 to 10, more preferably from 0.5 to 5.

For the purposes of the present invention, the expression "carboxy group" is meant to comprise carboxylic acid groups and derivatives thereof like salts, halides, esters and anhydrides, esters being particularly preferred.

A (per)fluoropolymer containing more than two carboxy groups is preferably a linear (per)fluoropolyether having two end groups, each of said two end groups containing two carboxy groups. This linear (per)fluoropolyether can be obtained by reaction of a linear (per)fluoropolyether having two end groups, each end group comprising a reactive group, with a reactive compound containing two carboxy groups or any other groups that can be converted into carboxy groups according to known methods, for example esters, anhydrides, amides, alcohols, aldehydes, ketones and alkenes.

Examples of compounds containing two carboxy groups or any other groups that can be converted into carboxy groups are malonic acid derivatives and aromatic or heteroaromatic compounds bearing two carboxy groups on the aromatic or heteroaromatic ring, such as dicarboxy phenols, preferably 3,5-dicarboxy phenol.

A preferred embodiment of this linear (per)fluoropolyether complies with formula (I) below:

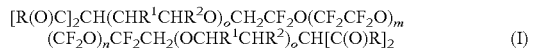

wherein:
m and n are integers equal to or higher than 1, preferably ranging from 1 to 20, selected in such a way as the molar ratio between the —$CF_2CF_2O$— and the —$CF_2O$— units is as defined above;
R is hydrogen or a straight or branched alkoxy group, preferably a $C_1$-$C_4$ alkoxy group, more preferably an ethoxy group;
$R^1$ and $R^2$ are hydrogen or one is hydrogen and the other is methyl;
o is 0 or an integer higher than 1, preferably ranging from 1 to 5.

The compound of formula (I) in which R is as defined above is obtainable according to conventional methods by condensation of a (per)fluoropolyether diol of formula (II):

wherein m, n, o, $R^1$ and $R^2$ are as defined above, with a malonic ester of formula (III)

$$CH_2[C(O)R']_2 \qquad (III)$$

wherein R' is a straight or branched alkoxy group as defined above, optionally followed by hydrolysis of the ester group according to known methods.

Typically, the alcohol groups in (per)fluoropolyether diol (II) are transformed into suitable leaving groups before the reaction with malonic ester (III). Examples of suitable leaving groups are triflate, nonaflate, tosylate and mesylate. In particular, when in formula (II) above o is 0, the leaving groups is selected from triflate and nonaflate, while when o is an integer equal to or higher than 1, the leaving group is selected from tosylate and mesylate.

(Per)fluoropolyether diols of formula (II) above in which o is 0 can be prepared, for example, according to the procedure disclosed in EP 1114842 B (AUSIMONT SPA IT) 11 Jul. 2011, while (per)fluoropolyether diols of formula (II) in which o is an integer equal to or higher than 1 can be prepared by reacting a (per)fluoropolyether diol of formula (II) above in which o is 0 with ethylene oxide, propylene oxide, ethylene carbonate or propylene carbonate in the presence of an inorganic or organic base catalyst, for example an alkaline or terrous-alkaline hydroxides, or tertiary amines.

For the purposes of the present description, the expression "a (per)fluoropolymer containing more than two carboxy groups" is meant to comprise also mixtures of two or more (per)fluoropolymers, preferably (per)fluoropolyethers, containing more than two carboxy groups and differing from each other in the molecular weight of the ($R_f$) chain.

In the compositions of the invention, a polyamine is an organic compound containing more than one amino group; in particular, a polyamine can be a polyalkylene polyamine or a polyaryl polyamine. Typically, the polyamine is a polyalkylene polyamine complying with formula (IV) below:

wherein x is an integer equal to or higher than 1 and y is 0 or an integer equal to or higher than 1. Preferred polyamines are ethylene diamine and diethylene triamine; more preferably, the polyamine is diethylene triamine.

Advantageously, the compositions of the invention comprise, in addition to a polyamine as defined above, a compound containing one or more amido or hydrazido groups. Indeed, compounds containing such groups introduce further moieties able to form further hydrogen bonds and, therefore, a more cohesive structure. Typically, compounds containing one or more amido or hydrazido groups are urea, malonamide and malonic dihydrazide. Most preferably, the compositions of the invention comprise urea. According to a most preferred embodiment, these compositions comprise a (per)fluoropolyether of formula (I) as defined above, preferably a linear (per)fluoropolyether of formula (I) in which R is ethyl, a polyamine of formula (IV), preferably ethylene diamine or diethylene triamine, most preferably diethylene triamine, and urea.

A further object of the present invention are polymer compositions which comprise, in addition to a (per)fluoropolymer containing more than two carboxy groups, also a (per)fluoropolymer containing two carboxy groups, the terms "(per) fluoropolymer" and "carboxy groups" being as defined above.

For the purposes of the present description, the expression "a (per)fluoropolymer containing two carboxy groups" is meant to comprise also mixtures of two or more (per)fluororopolymers, preferably (per)fluoropolyethers, containing two carboxy groups and differing from each other in the molecular weight of the ($R_f$) chain.

A preferred embodiment of (per)fluoropolyether containing two carboxy groups is a linear (per)fluoropolyether having two end groups, wherein each of said two end groups contains one carboxy group. This linear (per)fluoropolyether can be obtained by reaction of a linear (per)fluoropolyether having two end groups, each of said two end groups containing a reactive group, with a reactive compound containing one carboxy group or any other group that can be converted into a carboxy group as defined above.

An example of linear (per)fluoropolyether according to this preferred embodiment complies with formula (V):

$$RC(O)CH_2O(CHR^1CHR^2O)_oCH_2CF_2O(CF_2CF_2O)_m(CF_2O)_nCF_2CH_2(OCHR^1CHR^2)_oOCH_2C(O)R \quad (V)$$

wherein m, n, o, R, $R^1$ and $R^2$ are as defined above.

The linear (per)fluoropolyether of formula (V) can be obtained by reaction of a linear (per)fluoropolyether diol of formula (II) as defined above with an ester of formula (VI)

$$XCH_2C(O)R' \quad (VI)$$

wherein X is a leaving group, preferably selected from halogen, triflate, nonaflate, tosylate and mesylate and R' is as defined above.

The polymer compositions of the invention can be prepared by mixing together:
- a (per)fluoropolymer having more than two carboxy groups;
- a polyamine and, optionally,
- a compound containing one or more amido or hydrazido group and/or a (per)fluoropolymer having two carboxylate groups.

Accordingly, it is a further object of the present invention a process which comprises mixing together:
- a (per)fluoropolymer having more than two carboxy groups;
- a polyamine and, optionally,
- a compound containing one or more amido or hydrazido groups and/or a (per)fluoropolymer having two carboxy groups, wherein "(per)fluoropolymer", "polyamine", and "compound containing one or more amido or hydrazido groups" are as defined above, including preferred embodiments.

The polymer compositions of the invention are endowed with elastomeric properties and are able to form supramolecular assemblies joined together through hydrogen bonds; accordingly, they can be conveniently used for the preparation of moulded articles. Typically, moulded articles are prepared by means of a process which comprises hot-mixing and moulding a composition comprising:
- a (per)fluoropolymer having more than two carboxy groups;
- a polyamine and, optionally,
- a compound containing one or more amido or hydrazido groups and/or a (per)fluoropolymer having two carboxy groups wherein "(per)fluoropolymer", "polyamine", and "compound containing one or more amido or hydrazido groups" are as defined above, including preferred embodiments.

A preferred process P for preparing moulded articles from the compositions of the present invention comprises the following steps:
a) mixing a (per)fluoropolymer having more than two carboxy groups and, optionally, a (per)fluoropolymer having two carboxy groups with a polyamine under such conditions as to allow the carboxy groups of the (per)fluoropolymer(s) and the amino groups of the polyamine to completely react and form amido groups;
b) moulding and pressing the reaction product from step a).

A preferred process P' for preparing moulded articles from compositions comprising, in addition to a polyamine, a compound containing one or more amido or hydrazido groups, comprises the following steps:
a') mixing a (per)fluoropolymer having more than two carboxy groups, and, optionally, a (per)fluoropolymer having two carboxy groups, with a polyamine under such conditions as to allow the carboxy groups of the (per)fluoropolymer(s) and the amino groups of the polyamine to completely react and form amido groups;
b') hot-mixing the reaction product from step a') with a compound containing one or more amido or hydrazido groups;
c') moulding and pressing the reaction product from step b').

In particular, for the preparation of compositions in which the (per)fluoropolymer having more than two carboxy groups is a (per)fluoropolyether complying with formula (I) above, the (per)fluoropolymer having two carboxy groups is a (per)fluoropolyether complying with formula (V) above, the polyamine is diethylene triamine and the compound containing one or more amido or hydrazido groups is urea, step a) and a') are typically performed in the absence of solvents, by bringing into contact the (per)fluoropolymer(s) with the polyamine, heating the mixture at a temperature ranging preferably from 90 to 110° C., more preferably at about 100° C. The equivalent ratio of (per)fluoropolyether to polyamine usually ranges from 1 to 2 and is preferably of 1.5.

Step b') is preferably carried out at a temperature ranging from 150 to 200° C., while steps b) and c') are preferably carried out at a temperature ranging from 150 to 180° C., at a pressure ranging preferably from 150 to 220° bar, more preferably at about 200 bar. The equivalent ratio of (per)fluoropolyether to compound containing one or more amido or hydrazido groups usually ranges from 1 to 2 and is preferably of 1.5. Hot mixing, moulding and pressing are carried out with conventional methods and equipments.

The moulded articles obtained from the compositions of the invention are endowed with elastomeric properties at room temperature; accordingly, they can be used for manufacturing articles like o-rings, gaskets and sealants.

It has also been observed that moulded articles made from compositions of the invention containing:
- a (per)fluoropolymer having more than two carboxy groups and
- a (per)fluoropolymer having two carboxy groups wherein at least one of the two (per)fluoropolymers has an average molecular weight equal to or higher than 2000 are endowed with self-healing properties at room temperature, i.e. they possess an intrinsic ability to repair mechanical damages without melting and cooling. Furthermore, contrary to the compositions disclosed in CORDIER, Philippe, et al. Self-healing and thermoreversible rubber from supramolecular assembly. *Nature Letters*. 21 Feb. 2001, vol. 451, p. 977-980. they do not require to be added with dodecane in order to be elastomeric or self-healing.

The invention is now illustrated in greater detail in the following experimental section by means of non-limiting examples.

Should the disclosure of any patents, patent applications, and publications which are incorporated herein by reference be in conflict with the description of the present application to the extent that it may render a term unclear, the present description shall take precedence.

EXPERIMENTAL SECTION

Solvents and Reagents

T-But-OK; t-ButOH, diethylmalonate, Cl-ethylacetate were used as received from Aldrich.

Bis-trifluoromethylbenzene was purified, before use, by double distillation.

Preparation 1—Fomblin® Z DOL 2000 PFPE Nonaflate

Fomblin® Z DOL 2000 PFPE nonaflate was prepared according to the procedure disclosed in Journal of Fluorine Chemistry 95 (1999) 51-70 by reacting, at room temperature, Fomblin® Z DOL 2000 PFPE of formula:

$$HOCH_2CF_2(OCF_2CF_2O)_m(CF_2O)_nCF_2CH_2OH (m/n=2; PM\ 2000)$$

with perfluorobutansulphonylfluoride.

Upon completion of the reaction, Fomblin® Z DOL 2000 PFPE nonaflate of formula:

$$n\text{-}C_4F_9S(O)_2OCH_2CF_2(OCF_2CF_2O)_m(CF_2O)_nCF_2CH_2OS(O)_2C_4F_9\text{-}n$$

was isolated as heavy phase after two washings with methanol.

$^{19}$F-NMR analysis confirmed the expected structure, whose diagnostic signals (δ) were:

$CF_2$ α to $CH_2$: −79 and −81;
$CF_2$ α, β, and γ to the sulfonic group: −110, −121 and −126;
$CF_3$: −82. The MW was 2586 and EW 1293.

Nonaflates of PEPE diols having different MW have been prepared following the same procedure.

Preparation 2—Malonic Tetraester from Fomblin® Z DOL 2000 PFPE 38.6 g (345 meq) t-ButOK was dissolved in 300 g t-ButOH; the solution was warmed at 60° C. for 1 h, then 73.6 g diethylmalonate (460 meq) was added dropwise in two hours, while internal temperature was maintained at 60° C.

Finally, t-ButOH was removed by gentle distillation and the solid residue was dissolved in bis-trifluoromethylbenzene.

The resulting suspension was warmed to 100° C. and Fomblin® Z DOL 2000 PFPE-nonaflate (300 g, 230 meq) was added dropwise in 4 hours; one hour after completion of the addition, $^{19}$F-NMR analysis confirmed that the conversion to tetraester was completed (MW 2222, EW 555). Specifically, the diagnostic signals were the resonance of the $CF_2$ α to the $CH_2$ at −70 and −72 and the resonance of the hydrogen at: 3.25 (CH); 2.5 ($CH_2$ α to the $CF_2$); 1.0 ($CH_3$); 3.85 $CH_2$ of ethyl group.

Minor impurities due to a bis-adduct resulting from further reaction of the CH— group of diethyl malonate were present, as confirmed by the characteristic resonance of the $\underline{CF_2}$—$CH_2$—C—$CH_2\underline{CF_2}$— at −65 and −67.

The title product was isolated after several washings with water and a hydro-alcoholic solution.

Preparation 3—Malonic Tetraester from Fomblin® Z DOL1200 PFPE

This compound was prepared from 300 g Fomblin® Z DOL PFPE nonaflate according to preparation 2.

Preparation 4—Diethyl Ester from Fluorolink® D10H PFPE 40 g t-But-OH and 19 g (170 meq) t-ButOK were charged in a ½ l reactor. 100 g (130 meq) Fluorolink® D10H PFPE, characterized by the following structure:

$$HOCH_2CF_2(OCF_2CF_2O)_m(CF_2O)_nCF_2CH_2OH\ (m/n=2.5; MW\ 1500)$$

was added under stirring and at room temperature.

The reaction mass was maintained under stirring at room temperature for 30', then 19.7 g (170 meq) $ClCH_2COOEt$ was added and internal temperature was raised to 80° C. for 12 hours. Thereafter, the reaction mass was cooled down to room temperature and 200 ml water containing 10% by weight 37% HCl was added; after separation of two phases, the bottom one was separated and dried, to provide 104 g title product, as confirmed by $^1$H-NMR and IR analyses.

$^1$H-NMR: 4.2 ($CH_2$ α to the $CF_2$); 3.95 ($CH_2$ α to the carbonyl group). MW: 1793; EW: 896.

Preparation 5—Diethyl Ester from PFPE-Diol $HOCH_2CF_2(OCF_2CF_2O)_m(CF_2O)_nCF_2CH_2OH$ (m/n=2.0; MW 1200 and average functionality=1.95)

Following the procedure described in preparation 4, but using 80 g (130 meq) PFPE-diol with the following structure: $HOCH_2CF_2(OCF_2CF_2O)_m(CF_2O)_nCF_2CH_2OH$ (m/n=2.0; MW 1200 and average functionality=1.95), 104 g title product was isolated, as confirmed by $^1$H-NMR and IR analyses.

$^1$H-NMR: 4.2 ($CH_2$ α to the $CF_2$); 3.95 ($CH_2$ α to the carbonyl group).

MW: 1434; EW 717.

EXAMPLE 1

Composition 1

A composition according to the invention was prepared using the malonic tetraethyl ester obtained according to preparation 3 (100 g, 259 meq) and diethylenetriamine (20 g, 259 meq). After moulding at 100° C., a rubber-like material was obtained.

EXAMPLE 2

Reference Composition

A composition was prepared according to example 1 using the diethyl ester (90 g, 126 meq) obtained according to preparation 5 and diethylenetriamine (5.65 g, 188 meq). A viscous liquid was obtained.

EXAMPLE 3

Moulded Article 1

The malonic tetraethyl ester (40 g, 72 meq) obtained according to preparation 2, and the diethylester (64.5 g, 72 meq), obtained according to preparation 4 were mixed in a round-bottom flask; thereafter, 11.12 g (216 meq) diethylenetriamine (DETA) was added and the temperature was increased to 100° C. Conversion of the ester groups to amido groups was monitored by IR analysis; when the conversion was complete, the ester peak at 1753 cm$^{-1}$ disappeared and a new signal of the amido groups at 1673 cm$^{-1}$ was observed.

The reaction mass viscosity increased with conversion and finally a rubber-like product at room temperature, highly viscous at 100° C., was obtained.

This product was transferred into a hot mixer and stirred for 30' at 160° C.; finally, 6.5 g (216 meq) urea were added and internal temperature was increased by 10° C. per hour until the hot-mixer external temperature reached 190° C.

The reaction mass was cooled down to room temperature and mould in a press at 160° C. for 10' at 200 bar to provide a rubber-like slab.

This slab was cut into two pieces with a knife, then the two cut surfaces were joined together after 5 minutes; tensile behaviour was measured after 24 h at room temperature according to DIN 53504 (test-piece type S2; rate 200 mm/min.) and a similar value as that one obtained before the cut was obtained. Thus, it was concluded that moulded article 1 had self-healing properties.

EXAMPLE 4

Moulded Article 2

This moulded article was prepared according to example 3, using the malonic tetraethyl ester (50 g, 90 meq) obtained according to preparation 2, the diethyl ester (64.5 g, 90 meq) obtained according to preparation 3, 11.12 g (216 meq) diethylenetriamine (DETA) and 6.5 g (216 meq) urea.

Tensile behaviour was measured as described in example 1 and a similar value as that obtained before cut was obtained; thus, it was concluded that moulded article 2 had self-healing properties.

EXAMPLE 5

Moulded Article 3

This moulded article was prepared following example 3, using the malonic tetraethyl ester (69.8 g, 180 meq) obtained according to preparation 3, the diethyl ester obtained according to preparation 5 (64.5 g, 90 meq), 11.12 g (216 meq) diethylenetriamine (DETA) and 6.5 g (216 meq) urea.

After moulding and pressing, a rubber-like slab was obtained.

EXAMPLE 6

Moulded Article 4

This moulded article was prepared according to example 3, using the malonic tetraethyl ester (17.4 g, 45 meq) obtained according to preparation 3, the malonic tetraethyl ester (25.0 g, 45 meq) obtained according to preparation 2, the diethyl ester (64.5 g, 90 meq), obtained according to preparation 5, 13.8 g (270 meq) diethylenetriamine and 8.1 g (270 meq) urea.

After moulding and pressing, a rubber-like slab was obtained.

EXAMPLE 7

Reference Example

A self-healing material was prepared according to the procedure disclosed in Nature Letters Vol. 45 (2008) 977-980. The resulting compound, referred to as "reference material A", resembled to a translucent glassy plastic. When heated to 90° C., well above its glass transition temperature (Tg=28° C.), it behaved like a soft rubber with strain at break of about 350% and it completely recovered its dimensions after being deformed to 100%

Test 1—Chemical Resistance

Swelling data on moulded articles 1 and compared to those of reference material A confirmed the higher chemical resistance of the moulded articles of the invention if compared to reference material A. In some cases, complete solubility of reference material A was observed (for instance in benzyl alcohol and in methanol/chloroform mixtures).

Swelling values are reported in table 1 below:

TABLE 1

|  |  | MeOH/ Chloroform | H2O | Dodecane | MEK | Butyl Acetate | Benzyl Alcohol |
| --- | --- | --- | --- | --- | --- | --- | --- |
| Moulded article 1 | 24 h | 38% | 23.6% | 2.7% | 8% | 8% | 0.8% |
|  | 48 h | 51%* | 20% | 3.2% | 8.9% | 6.3% | 13.4% |
| Moulded article 2 | 24 h | 35% | 27.5% | 1.2% | 10.9% | 9% | 15-6% |
|  | 48 h | 34.5%* | 28.8% | 0.7% | 7.8% | 7% | 18.5% |
| Reference material A | 24 h | soluble | 42% | 8.5% | n.a. | 38% | soluble |
|  | 48 h | soluble | 55%* | 10% | 34%* | 35%* | soluble |

*The percentage comprises the swelling and extraction percentage.

Test 2—Calorimetric Behaviour

Table 2 below reports the calorimetric data obtained by DSC analysis of moulded articles 1 and 4, in comparison those of reference material A. It can be observed that, unlike reference material A that, being characterized by a higher Tg value, performs like plastic at room temperature, all the moulded articles of the invention show lower $Tg_s$ values, always well below room temperature. Consequently, they behave like elastomers at room temperature.

TABLE 2

| Moulded article | TgF (° C.) | TgH (° C.) |
| --- | --- | --- |
| Moulded article 1 | −100 | −23 |
| Moulded article 2 | −99 | −24 |
| Moulded article 3 | −83 | −1 |
| Moulded article 4 | −90 | −13 |
| Reference material A | — | 28 |

TgF = Tg PFPE phase
TgH = Tg hydrogenated phase

The invention claimed is:

1. A polymer composition comprising:
   a linear (per)fluoropolyether comprising a fully or partially fluorinated polyoxyalkylene chain having recurring units with at least one catenary ether bond and at least one fluorocarbon moiety and further comprising two end groups, each of said two end groups containing two carboxy groups each independently selected from carboxylic acids and salts, halides, esters and anhydrides thereof; and
   a polyamine.

2. The polymer composition according to claim 1, wherein the polyoxyalkylene chain comprises one or more randomly distributed repeating units selected from the following groups:
   (i) —CFXO—, wherein X is F;
   (ii) —CF$_2$CFXO—, wherein X is F;
   (iii) —CF$_2$CF$_2$CF$_2$O—; and
   (iv) —CF$_2$CF$_2$CF$_2$CF$_2$O—.

3. The polymer composition according to claim 1, wherein the linear (per)fluoropolyether comprises a compound of formula (I)

$$[R(O)C]_2CH(CHR^1CHR^2O)_oCH_2CF_2O(CF_2CF_2O)_m(CF_2O)_nCF_2CH_2(OCHR^1CHR^2)_oCH[C(O)R]_2 \quad (I)$$

wherein m and n are integers equal to or higher than 1, R is hydrogen or a straight or branched alkoxy group, $R^1$ and $R^2$ are hydrogen or one is hydrogen and the other one is methyl and o is 0 or an integer equal to or higher than 1.

4. The polymer composition according to claim 1, wherein the polyamine comprises a compound of formula (IV):

$$NH_2[(CH_2)_xNH]_y(CH_2)_xNH_2 \quad (IV)$$

wherein x is an integer equal to or higher than 1 and y is 0 or an integer equal to or higher than 1.

5. The polymer composition according to claim 4 wherein the polyamine is ethylene diamine or diethylene triamine.

6. The polymer composition according to claim 1 further comprising a compound containing one or more amido or hydrazido groups.

7. The polymer composition according to claim 6 wherein the compound containing one or more amido or hydrazido groups is urea.

8. A moulded article comprising the polymer composition of claim 6.

9. The polymer composition according to claim 1 further comprising a (per)fluoropolyether having two carboxy groups.

10. The polymer composition according to claim 9, wherein the (per)fluoropolyether having two carboxy groups is a linear (per)fluoropolyether having two end groups, each of said end groups containing one carboxy group.

11. The polymer composition according to claim 10, wherein the linear (per)fluoropolyether comprises a compound of formula (V):

$$RC(O)CH_2O(CHR^1CHR^2O)_oCH_2CF_2O(CF_2CF_2O)_m(CF_2O)_nCF_2CH_2(OCHR^1CHR^2)_oOCH_2C(O)R \quad (V)$$

wherein m and n are integers equal to or higher than 1, R is an alkoxy group, $R^1$ and $R^2$ are hydrogen or one is hydrogen and the other is methyl and o is 0 or an integer higher than 1.

12. A process for preparing a polymer composition according to claim 9 which comprises mixing together:
   a (per)fluoropolyether having two end groups, each of said two end groups containing two carboxy groups;
   a (per)fluoropolyether having two carboxy groups;
   a polyamine and, optionally, a compound containing one or more amido or hydrazido groups.

13. A moulded article comprising the polymer composition of claim 9.

14. A process for preparing a polymer composition according to claim 1 which comprises mixing together:
   a linear (per)fluoropolyether having two end groups, each of said two end groups containing two carboxy groups;
   a polyamine; and
   optionally further comprises adding a compound containing one or more amido or hydrazido groups.

15. A moulded article comprising the polymer composition of claim 1.

16. A process for preparing a moulded article, the method comprising hot-mixing and moulding a polymer composition according to claim 1.

* * * * *